(No Model.)
E. MARION.
Fish Hook.
No. 237,566.  Patented Feb. 8, 1881.
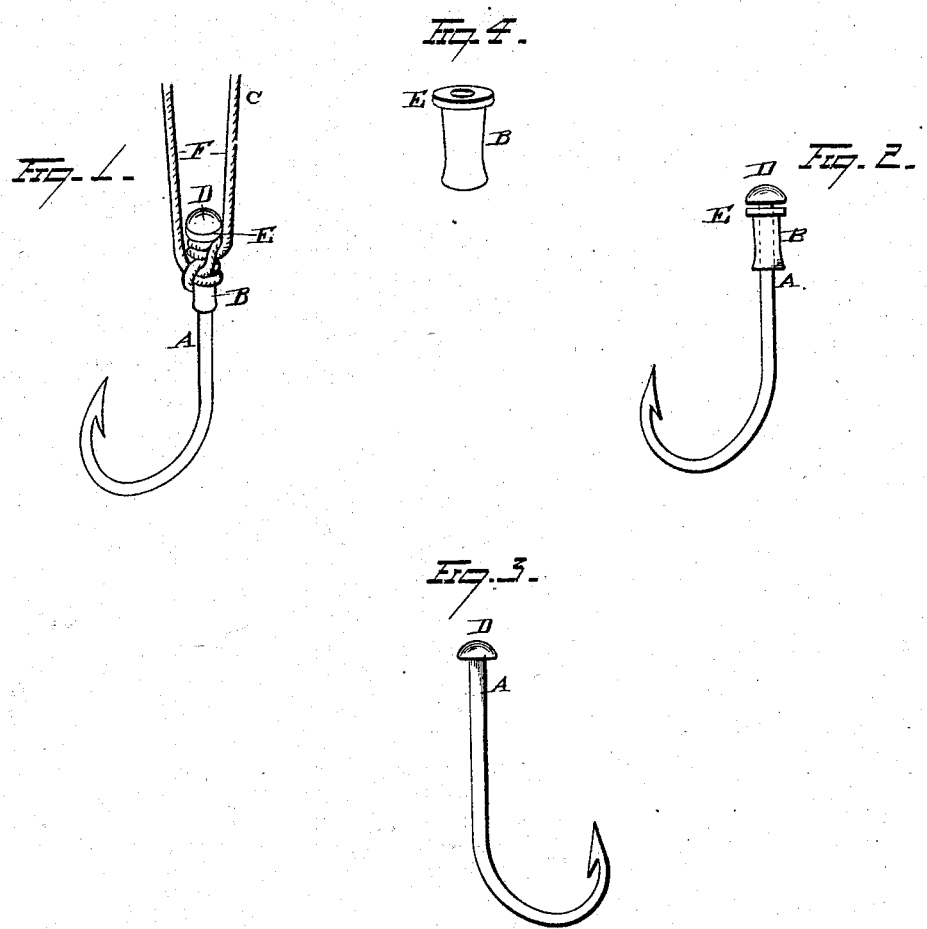
WITNESSES
INVENTOR
Edward Marion,
By H. A. Seymour,
ATTORNEY

UNITED STATES PATENT OFFICE.

EDWARD MARION, OF FORT MADISON, IOWA.

FISH-HOOK.

SPECIFICATION forming part of Letters Patent No. 237,566, dated February 8, 1881.

Application filed August 28, 1880. (No model.)

*To all whom it may concern:*

Be it known that I, EDWARD MARION, of Fort Madison, in the county of Lee and State of Iowa, have invented certain new and useful Improvements in Fish-Hooks; and I do hereby declare the following to be a full, clear, and exact description of the invention, such as will enable others skilled in the art to which it pertains to make and use it, reference being had to the accompanying drawings, which form part of this specification.

Heretofore the most common method of attaching fish-hooks to lines has consisted in lashing the line around the flattened end of the hook-shank, an operation which requires considerable dexterity to its neat and successful performance, and when accomplished is open to the objections that the sharp ends of the flattened shank are liable to cut the line and sever the connection between it and the hook; and also, the attachment being a rigid one, it will often happen that when the hook is turned to the right or left, as the case may be, the strands forming the line will be alternately wound tighter and unwound, the effect of which is to weaken the line. Many devices—such as swivels above the hook—have been resorted to to overcome these difficulties; but such devices, being necessarily complicated and cumbersome in construction, have met with little favor at the hands of sportsmen.

My invention, therefore, is designed to do away with these objections by providing means of attachment between the hook and line which shall at once be simple and durable and allow a rotary movement of the hook entirely independent of the line.

With these objects in view my invention consists, first, in the combination, with a fish-hook the shank whereof is provided with an enlarged end, of a sleeve having an outwardly-flaring flange at its upper extremity.

My invention further consists in the combination, with a fish-hook the shank whereof is provided with an enlarged end, of a sleeve having an outwardly-flaring flange at its upper extremity and a line wound around said sleeve.

In the accompanying drawings, Figure 1 is a view, in perspective, of my fish-hook. Fig. 2 is a similar view with the line detached therefrom. Fig. 3 is a detached view of the hook, and Fig. 4 is a detached view of the sliding sleeve.

Let A represent the shank of an ordinary fish-hook; B, a sleeve having sliding movement thereon, and C a fish-line wound around the sleeve. The shank A of the hook is provided at its upper end with a projecting flange, D, here assuming the form of a knob or button. This flange, which is designed to retain the sliding sleeve on the shank of the hook, may be of any character and shape, and formed integral with the hook or attached thereto.

The sliding sleeve B may be constructed of metal or wood, and varies in diameter and in length according to the size of the line and the character of the hook to which it is attached.

The sleeve B is attached to the hook either before the flanged head or knob is attached thereto or before the flange is "struck up," if it is formed integral with the hook, as the case may be; or, if desired, a metallic tube may be opened and clasped over the shank, and then joined by solder, although it is thought that as the line is wound tightly around the sleeve soldering will be unnecessary.

An outwardly-projecting flange or rib, E, is formed at the upper extremity of the sliding sleeve B, said flange E having the twofold function of offering bearing to the enlarged end D of the shank A of the hook and of retaining the fish-line on the said sleeve B, the ends of the line F being disposed of as shown in Fig. 1 of the drawings. By this method of attachment the hook will hang perpendicular with the line, and not at an angle therewith, as often happens when the old method of lashing the line directly to the shank is employed. My improved manner of suspending the hook from the line not only allows it unusual freedom of movement, but also, being substantially a swivel attachment, it will have a rotary movement to the right or left entirely independent of the line; whereas, when the hook is rigidly attached to the line and the hook is turned, as it often happens, the strands forming the line will be unwound and the line weakened, or the line will be wound upon itself, and knotting and tangling will be the result.

It will be thus seen that my invention possesses many attributes of superiority over the old forms of fish-hooks, and forms a simple, durable, and easy method of suspending a hook from a line, and, it is thought, will supply a want long felt among sportsmen.

Having fully described my invention, what I claim as new, and desire to secure by Letters Patent, is—

1. The combination, with a fish-hook the shank whereof is provided with an enlarged end, of a sleeve having an outwardly-flaring flange at its upper extremity, substantially as set forth.

2. The combination, with a fish-hook the shank whereof is provided with an enlarged end, of a sleeve having an outwardly-projecting flange at its upper extremity, and a line wound around said sleeve, substantially as set forth.

In testimony that I claim the foregoing I have hereunto set my hand.

EDWARD MARION.

Witnesses:
JOHN L. GRIGGS,
CHAS. JEWETT.